United States Patent [19]

Yamada et al.

[11] Patent Number: 5,555,132

[45] Date of Patent: Sep. 10, 1996

[54] WIDE-CONVERSION LENS AND A ZOOM LENS WITH IT

[75] Inventors: Katsu Yamada, Matsubara; Shusuke Ono, Takatsuki, both of Japan

[73] Assignee: Matsushita Electric Industrial Co., Ltd., Osaka-fu, Japan

[21] Appl. No.: 114,946

[22] Filed: Sep. 1, 1993

[30] Foreign Application Priority Data

Oct. 26, 1992 [JP] Japan ................................ 4-286494

[51] Int. Cl.$^6$ ............................................... G02B 15/02
[52] U.S. Cl. ............................................ 359/673; 359/793
[58] Field of Search ................................. 359/673, 793, 359/781, 782, 783, 784

[56] References Cited

U.S. PATENT DOCUMENTS

| | | | |
|---|---|---|---|
| 2,854,891 | 10/1958 | Schade | 359/793 |
| 4,818,081 | 4/1989 | Ito | 350/423 |
| 4,929,069 | 5/1990 | Shibayama | 350/423 |
| 4,936,661 | 6/1990 | Betensky et al. | 350/423 |

FOREIGN PATENT DOCUMENTS

| | | | |
|---|---|---|---|
| 55-95924 | 7/1980 | Japan | 359/793 |
| 63-253319 | 10/1988 | Japan . | |
| 1252913 | 10/1989 | Japan . | |
| 1319010 | 12/1989 | Japan . | |
| 4070616 | 3/1992 | Japan . | |
| 0178436 | 1/1923 | United Kingdom | 359/793 |

Primary Examiner—Georgia Y. Epps
Assistant Examiner—Michael A. Papalas
Attorney, Agent, or Firm—Panitch Schwarze Jacobs & Nadel, P.C.

[57] ABSTRACT

A wide-conversion lens for attachment to a master lens system consists of a bi-negative first lens in a object side and a bi-positive second lens in a master lens side, and in the second lens its radii of curvature of both surfaces are selected the same.

3 Claims, 11 Drawing Sheets

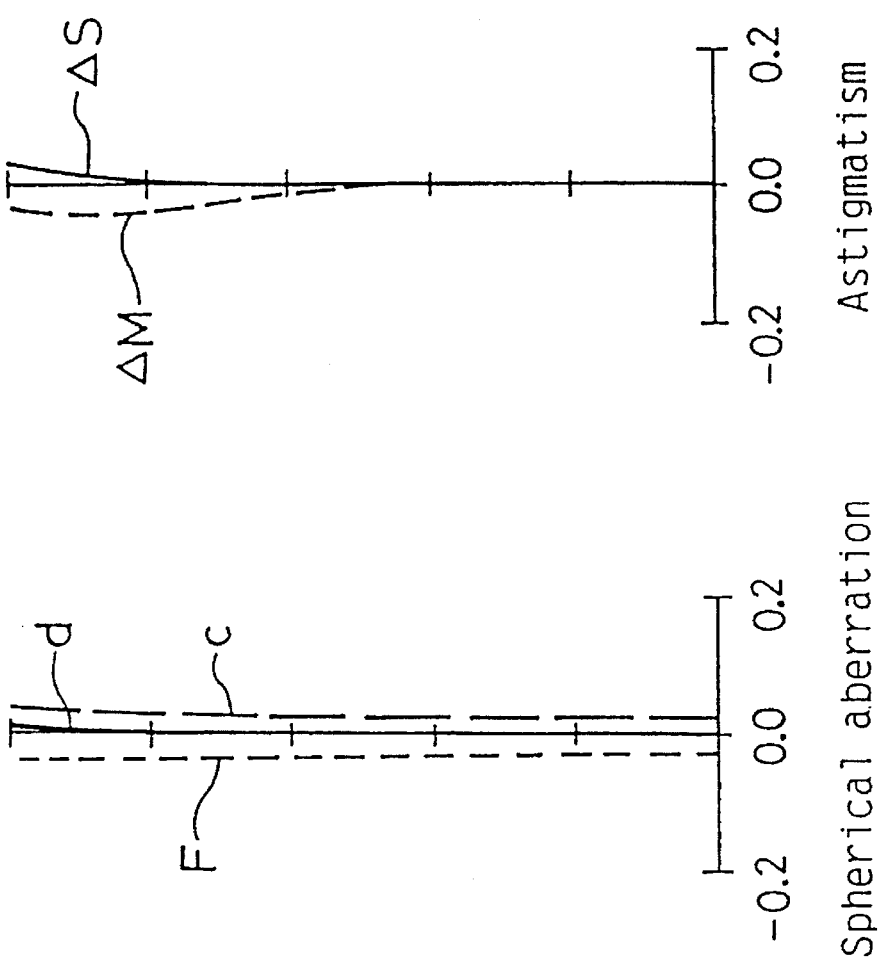
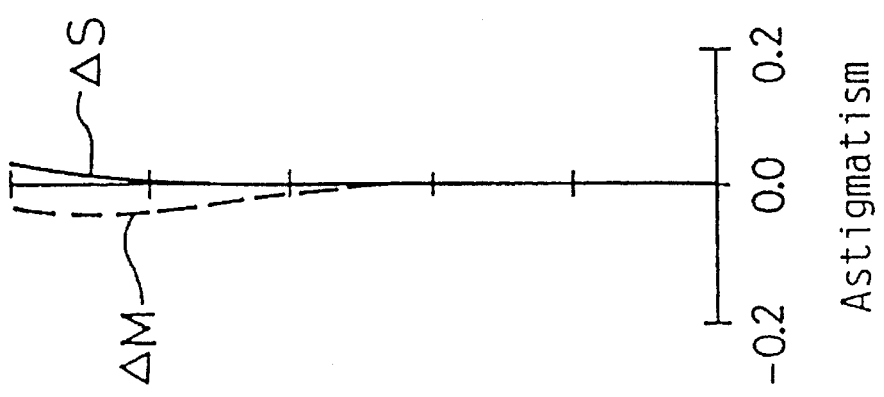
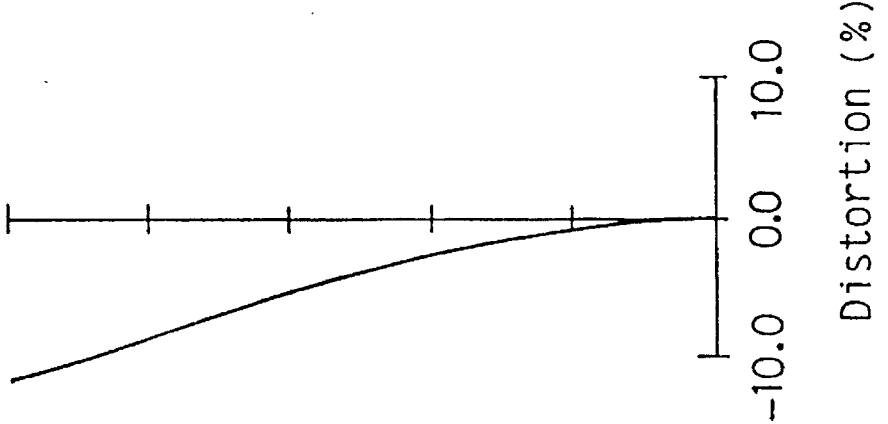

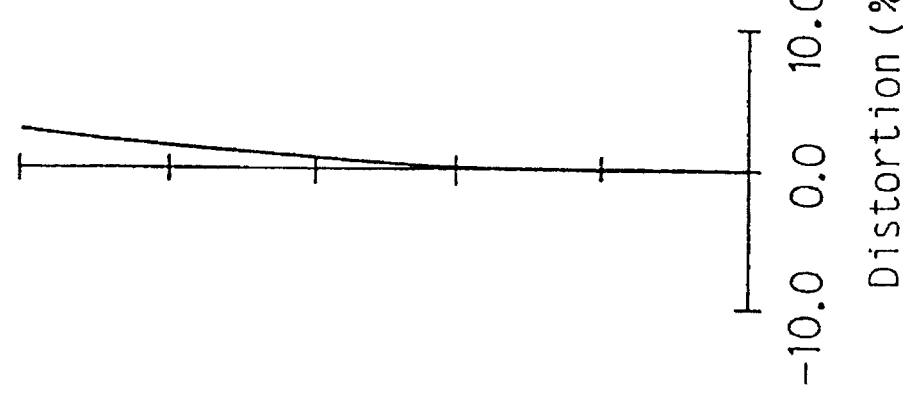

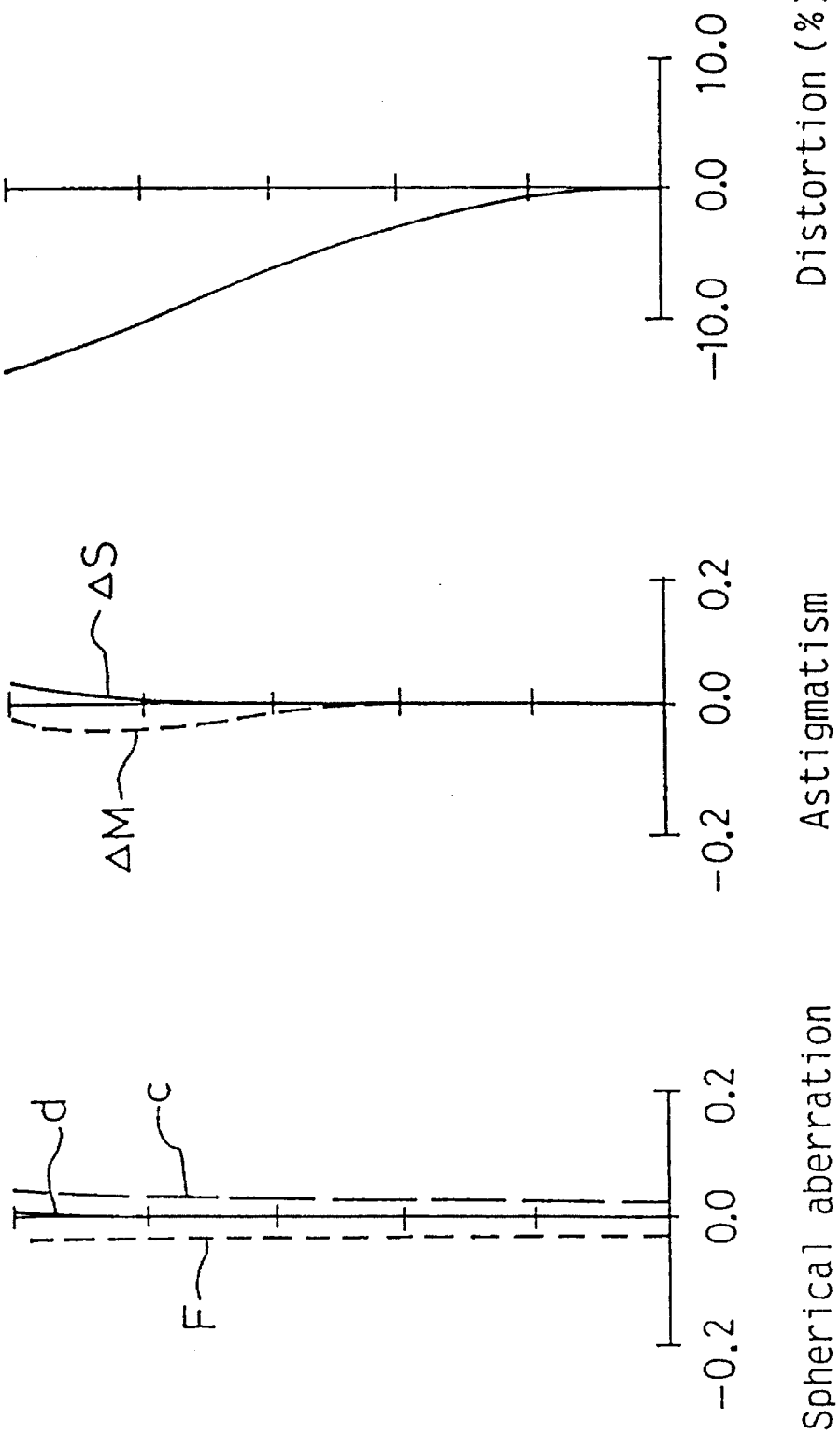

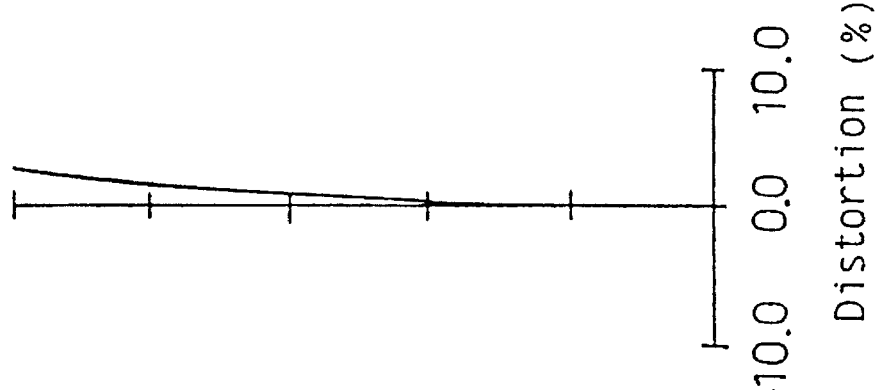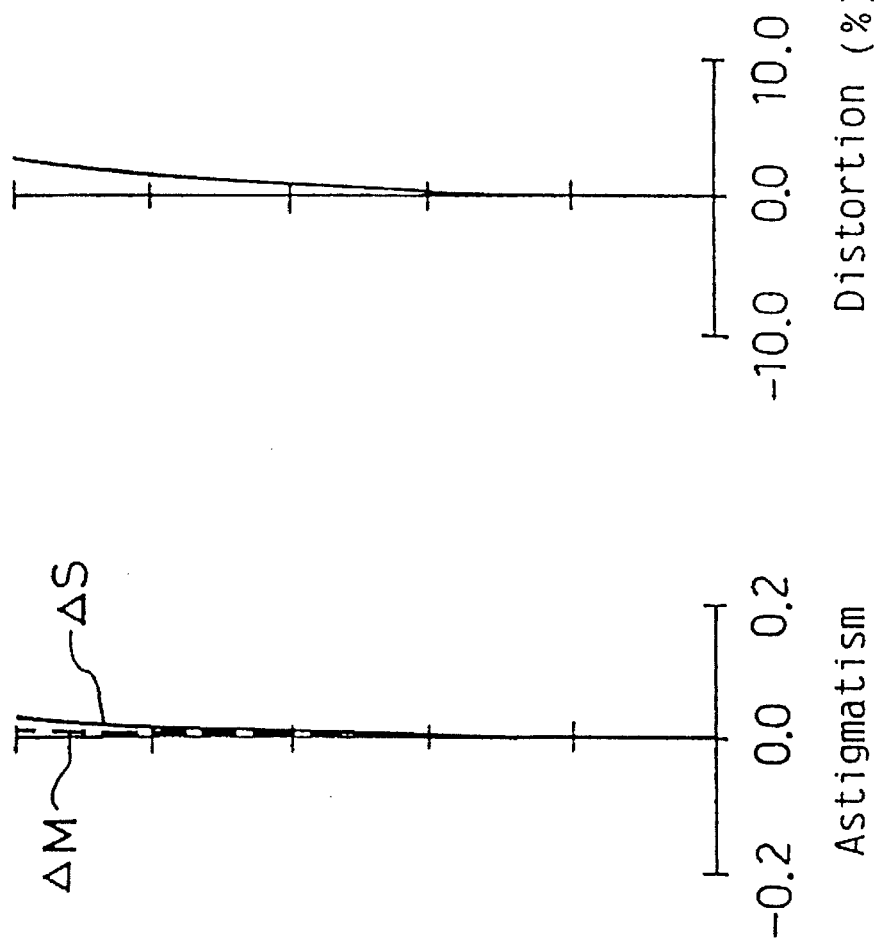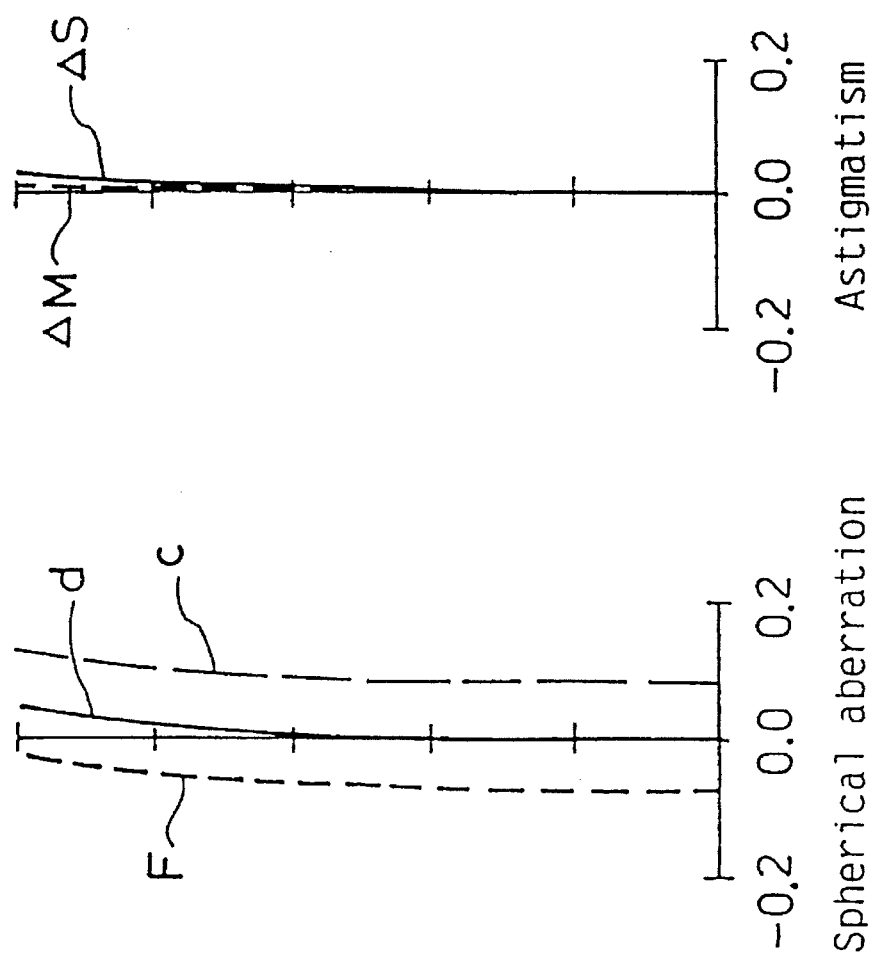

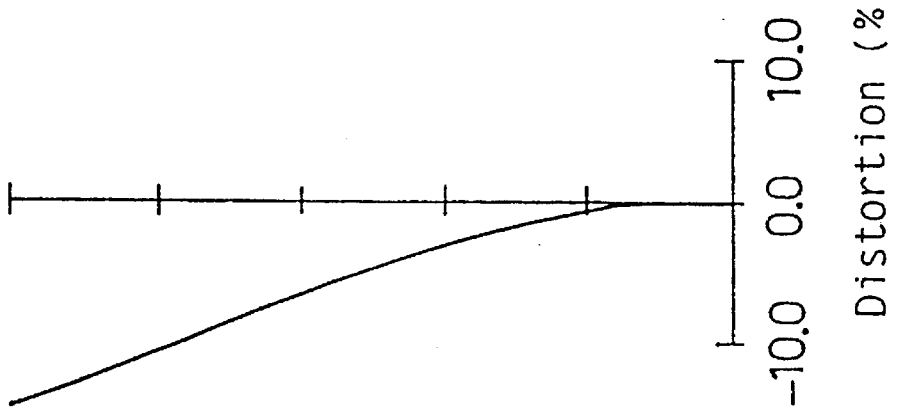
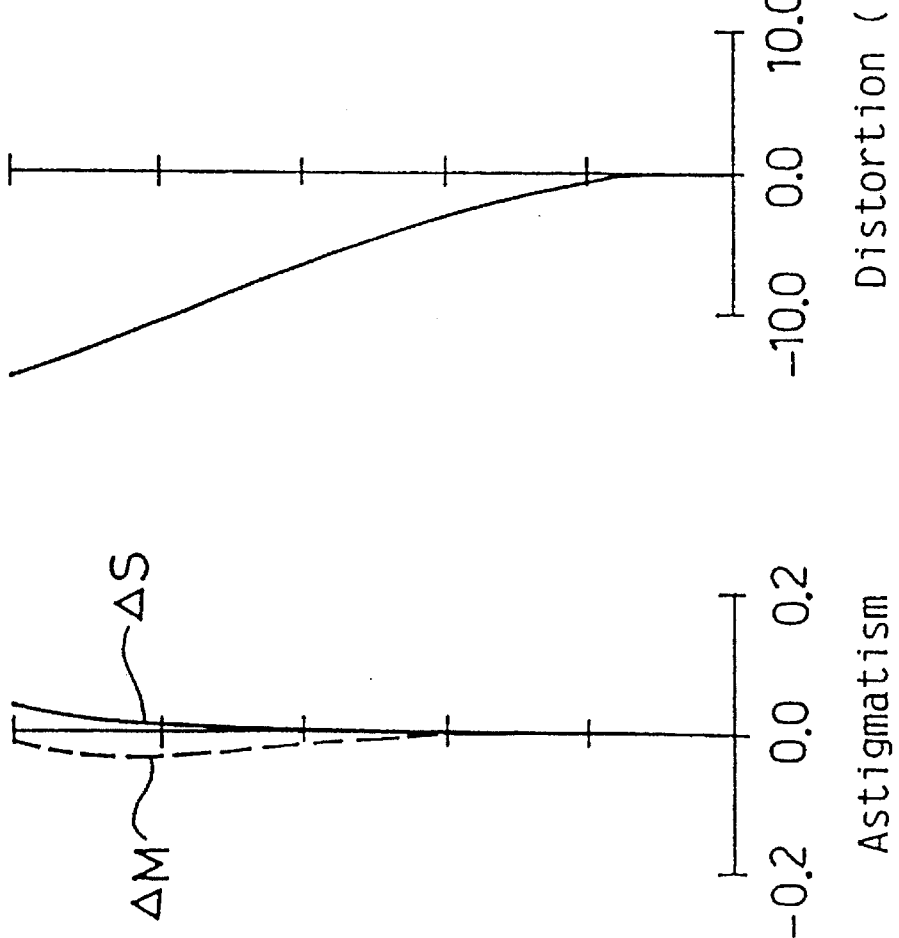
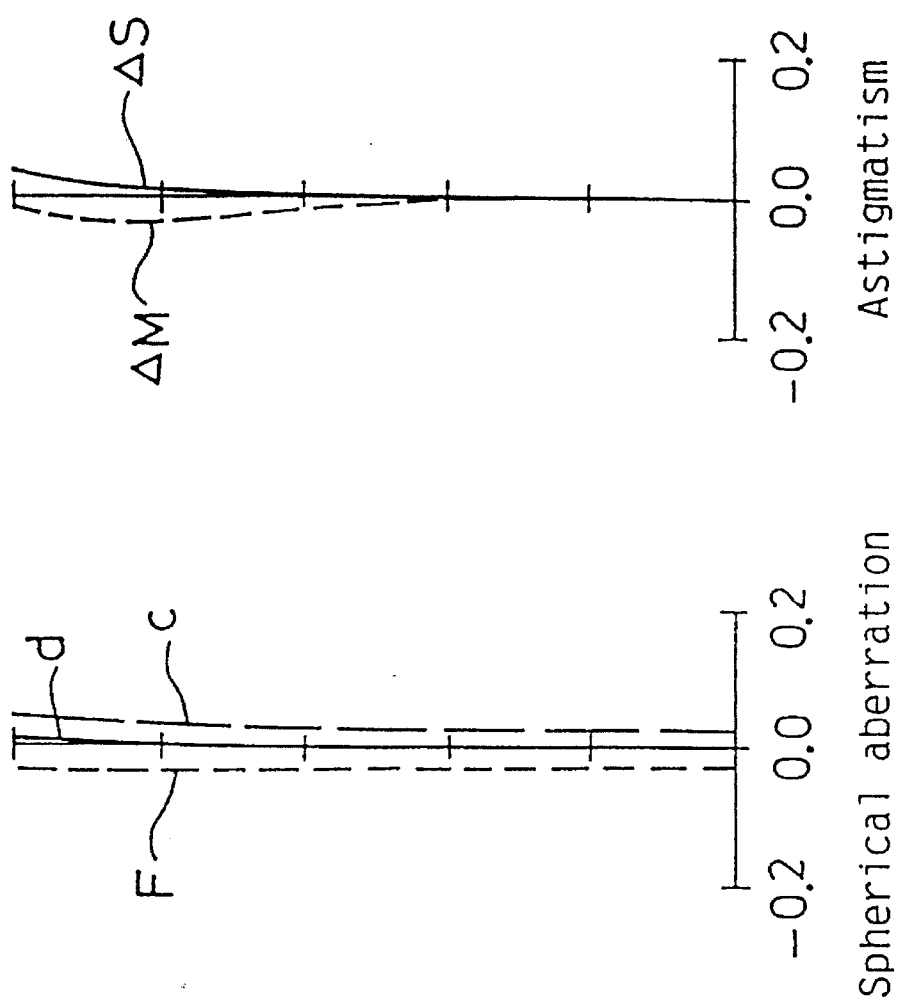
FIG. 6C ω=36.8°
FIG. 6B ω=36.8°
FIG. 6A f-number = 1.85

ω = 3.6°
Distortion (%)

ω = 3.6°
Astigmatism f-number = 2.72
Spherical aberration

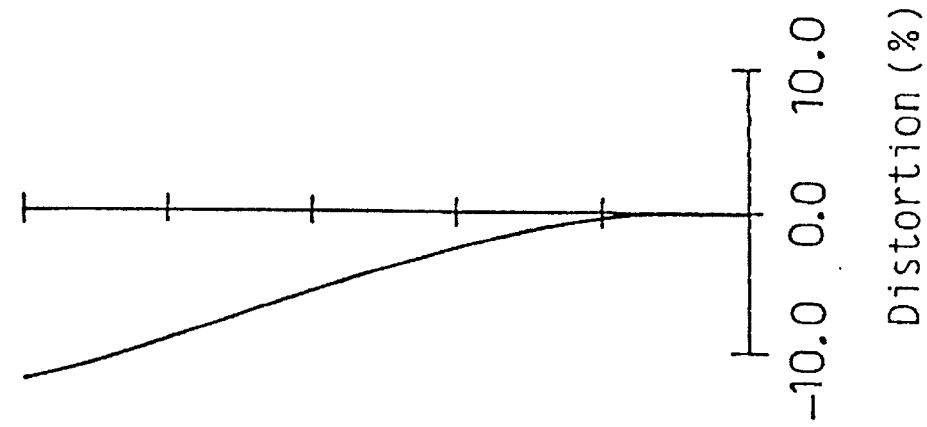
FIG. 8C ω=35.6°
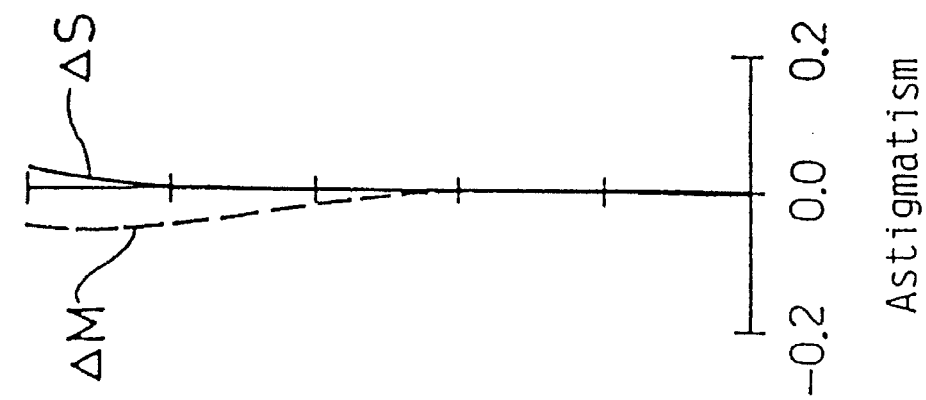
FIG. 8B ω=35.6°
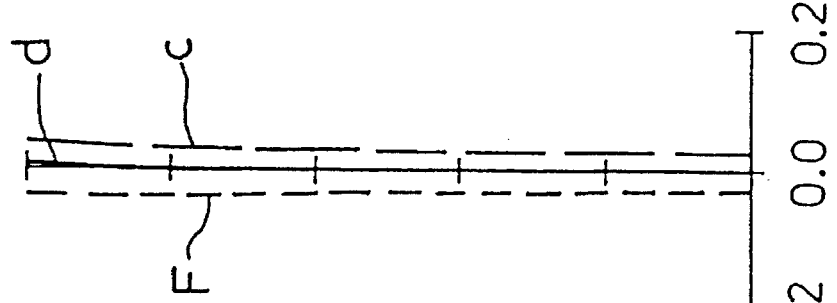
FIG. 8A f-number=1.85 f-number = 2.71

ω = 3.6°

ω = 3.6°

Spherical aberration

Astigmatism

Distortion (%)

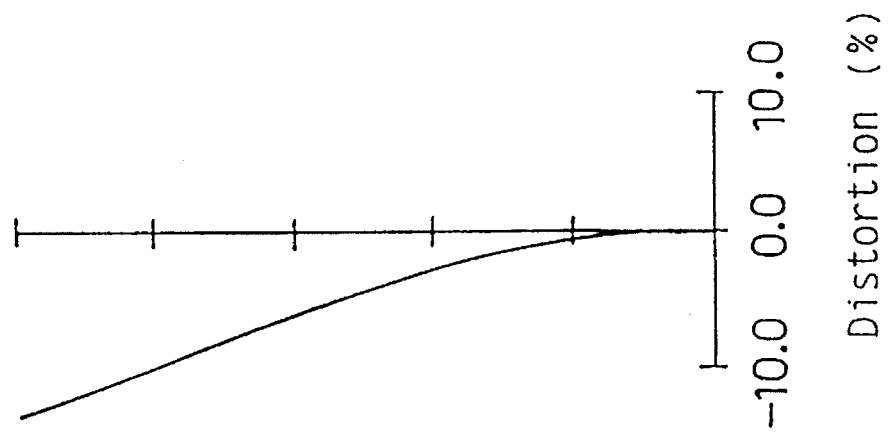
FIG. 10C ω=36.5°
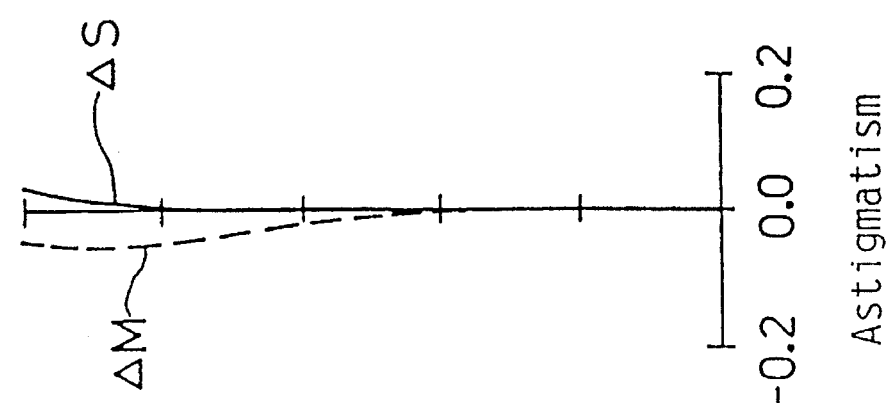
FIG. 10B ω=36.5°
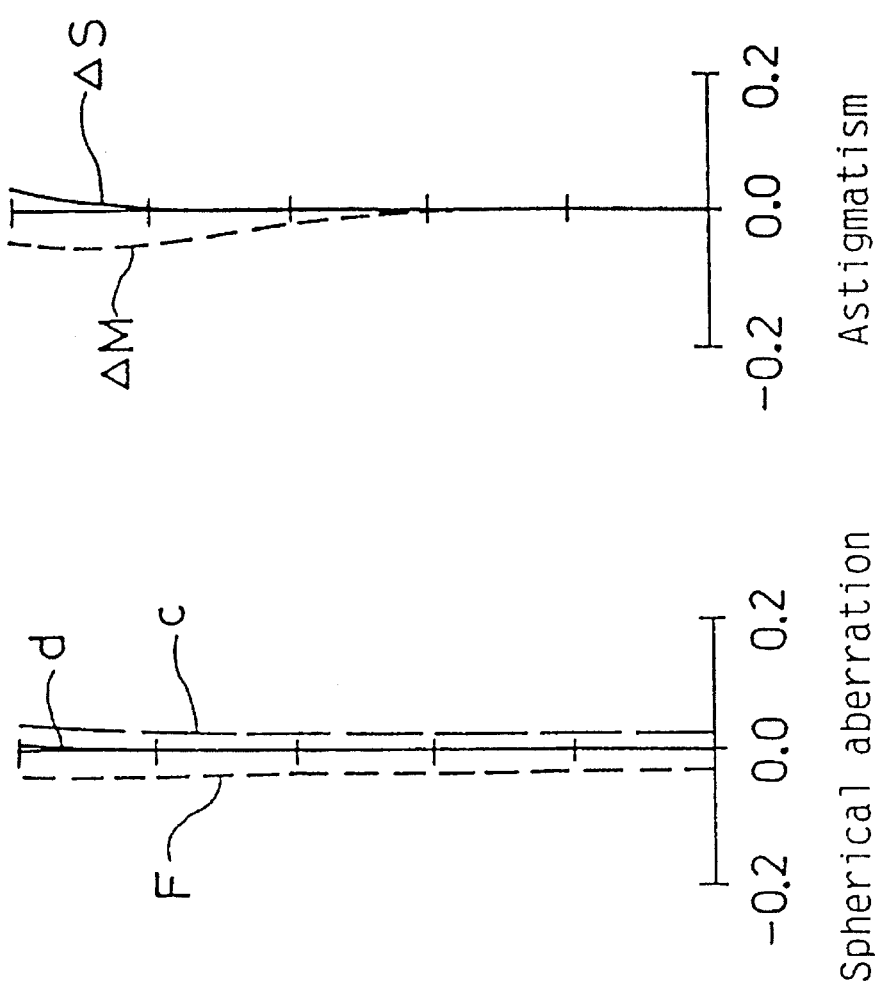
FIG. 10A f-number=1.85

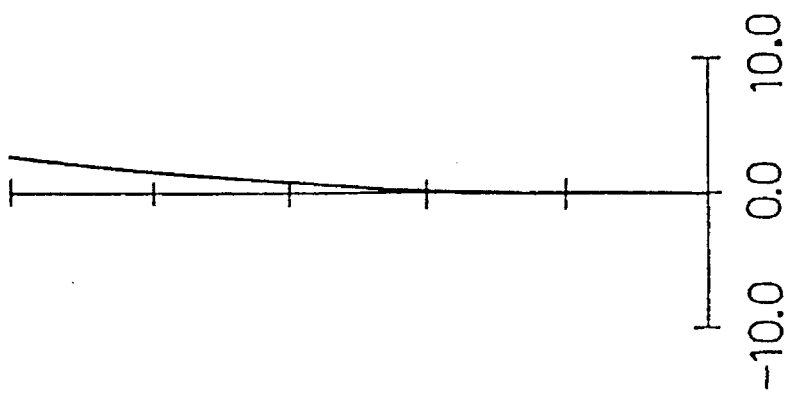
FIG. 11C ω=3.6°
Distortion (%)
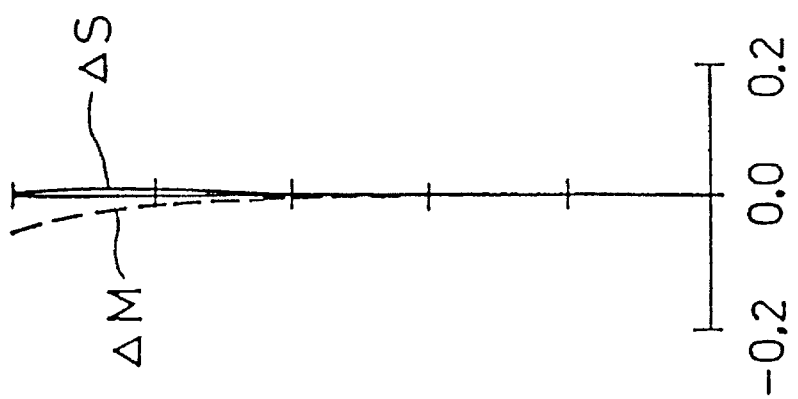
FIG. 11B ω=3.6°
Astigmatism
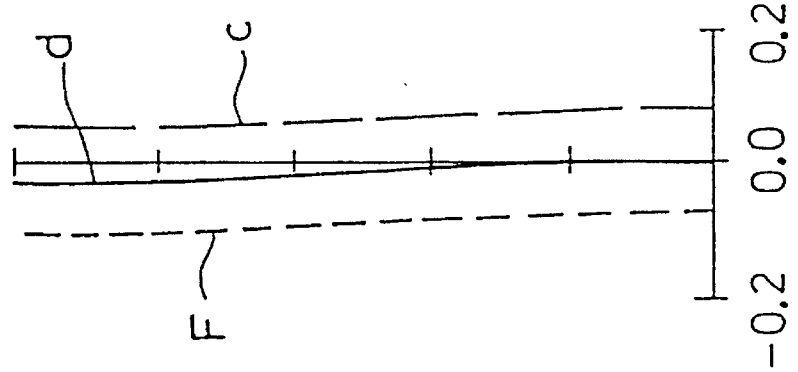
FIG. 11A f-number = 2.72
Spherical aberration

WIDE-CONVERSION LENS AND A ZOOM LENS WITH IT

FIELD OF THE INVENTION AND RELATED ART STATEMENT

1. Field of the Invention

The present invention relates to a wide-conversion lens for making a focal length of the combined whole of a lens system short by attaching it in front of a lens system, particularly to a wide-conversion lens for the use of taking still pictures as well as of taking moving pictures for a video camera, which has a high optical performance and is Compact and light weight by reducing number of component lenses to two.

2. Description of the Related Art

Heretofore, there has been a demand of converting an apparatus such as a video movie or a still camera which includes lenses into apparatus having a wide-angled lens. It has been proposed to attach a wide-conversion lens on the objective side of the lens for making the focal length of a lens system shorter. And at the same time, to make a lens system per se compact is also an inevitable matter, since it is also required to make the apparatus including lenses compact.

For instance, as an example of the wide-conversion lens of this kind, such as Japanese Unexamined published patent application Sho (hereafter Tokkai Sho) 63-253319 or Tokkai Hei 4-70616 can be cited. However, in Tokkai Sho 63-253319, the number of lenses constructing the lens system is three or four and hence it is rather complex. Whereas in Tokkai Hei 4-70616, although the number of lenses is two, its first lens is a bi-negative and its second lens is a bi-positive, and the radius of curvature of the objective side surface of the second lens and that of the image side surface have values that are close to each other. It was not satisfactory, because its handling in the assembling stage became difficult, and also its aberration characteristics was sufficient.

As has been described above, in wide-conversion lenses of prior art, there has been a problem that, when the lens number was reduced, a sufficient aberration compensation became unattainable, and the optical performance was degraded.

OBJECT AND SUMMARY OFT THE INVENTION

The purpose of the present invention is to remove the drawback described above, and to offer a compact wide-conversion lens of high performance with an afocal magnification of about 0.8.

In order to attain the above-mentioned purpose, the wide-conversion lens of the present invention is of a lens system that is to be attached on the front side of the camera lens. And it is characterized in that it comprises a bi-negative first lens and a bi-positive second lens, each having the same radius of curvature on its object side surface and on its image side surface for the convenience at its assembling stage.

Practically, it is desired that the above-mentioned wide-conversion lens satisfies the following conditions:

$$\nu 1 > 50 \tag{1}$$

$$\nu 2 > 55 \tag{2}$$

$$1.5 < \nu 2 - \nu 1 < 10 \tag{3}$$

where $\nu 1$ is an Abbe number of the first lens, and $\nu 2$ is an Abbe number of the second lens.

And, a zoom lens of the present invention that is to accomplish the above-mentioned purpose is a lens system which is constructed at least by attaching the above-mentioned wide-conversion lens in front of a zoom lens which is expected to serve as a master lens.

According to the above constitution, the lens system is configured by two lenses in a manner that the above-mentioned first lens to be a hi-negative lens and the above-mentioned second lens to be a bi-positive lens having the same radius of curvature on its objective side surface and its image side surface. As a result of such configuration, a compact wide-conversion lens having an afocal magnification of about 0.8 can be offered by a relatively simple constitution, and that, assembling becomes easy since there is no need of confirming which side of the negative lens must be adhered to which side of the positive lens.

And, by satisfying the afore-mentioned conditions (1)–(3), a high performance wide-conversion lens whose aberration is well compensated can be presented.

Also, by using the wide-conversion lens of the present invention, a compact and high performance zoom lens can be realized.

As has been described above, the advantageous feature present invention is that, by making the focal length of whole of the camera system short by attaching the wide-conversion lens of the present invention in front of a camera lens followed by constituting it using two lenses that satisfy the above-mentioned conditions, a light-weight and compact wide-conversion lens having a high optical performance of an afocal magnification of about 0.8 can be offered. And that, when it is attached on a zoom lens, a compact and light-weight zoom lens can be realized with maintaining its high optical performance over whole zooming range.

Furthermore, by making the radius of curvature of surfaces on the object side and on the image side of the second lens to be the same value, possible misplacement of the side of the lens, that lens, placement of wrong side of front and rear of the lens, In the assembling stage can be avoided.

Hereupon, although the above explanation has been given mainly on examples that the wide-conversion lens of the present invention was attached on a zoom lens, it is needless to mention that it can also be applied on a single focal length lens.

BRIEF DESCRIPTION OF THE DRAWINGS

FIG. 2(a)–(c) is an aberration diagram at the wide-angled extreme of the zooming action when the wide-conversion lens of the first embodiment of the present invention is attached on the front plane of a zoom lens.

FIG. 3(a)–(c) is an aberration diagram at the telescopic extreme of the zooming action when the wide-conversion lens of the first embodiment of the present invention is attached on the front plane of a zoom lens.

FIG. 4(a)–(c) is an aberration diagram at the wide-angled extreme of the zooming action when the wide-conversion lens of the second embodiment of the present invention is attached on the front plane of a zoom lens.

FIG. 5(a)–(c) is an aberration diagram at the telescopic extreme of the zooming action when the wide-conversion lens of the second embodiment of the present invention is attached on the front plane of a zoom lens.

FIG. 6(a)–(c) is an aberration diagram at the wide-angled extreme of the zooming action when the wide-conversion lens of the third embodiment of the present invention is attached on the front plane of a zoom lens.

FIG. 8(a)–(c) is an aberration diagram at the wide-angled extreme of the zooming action when the wide-conversion lens of the fourth embodiment of the present invention is attached on the front plane of a zoom lens.

FIG. 10(a)–(c) is an aberration diagram at the wide-angled extreme of the zooming action when the wide-conversion lens of the fifth embodiment of the present invention is attached on the front plane of a zoom lens.

FIG. 11(a)–(c) is an aberration diagram at the telescopic extreme of the zooming action when the wide-conversion lens of the fifth embodiment of the present invention is attached on the front plane of a zoom lens.

Figure 1:
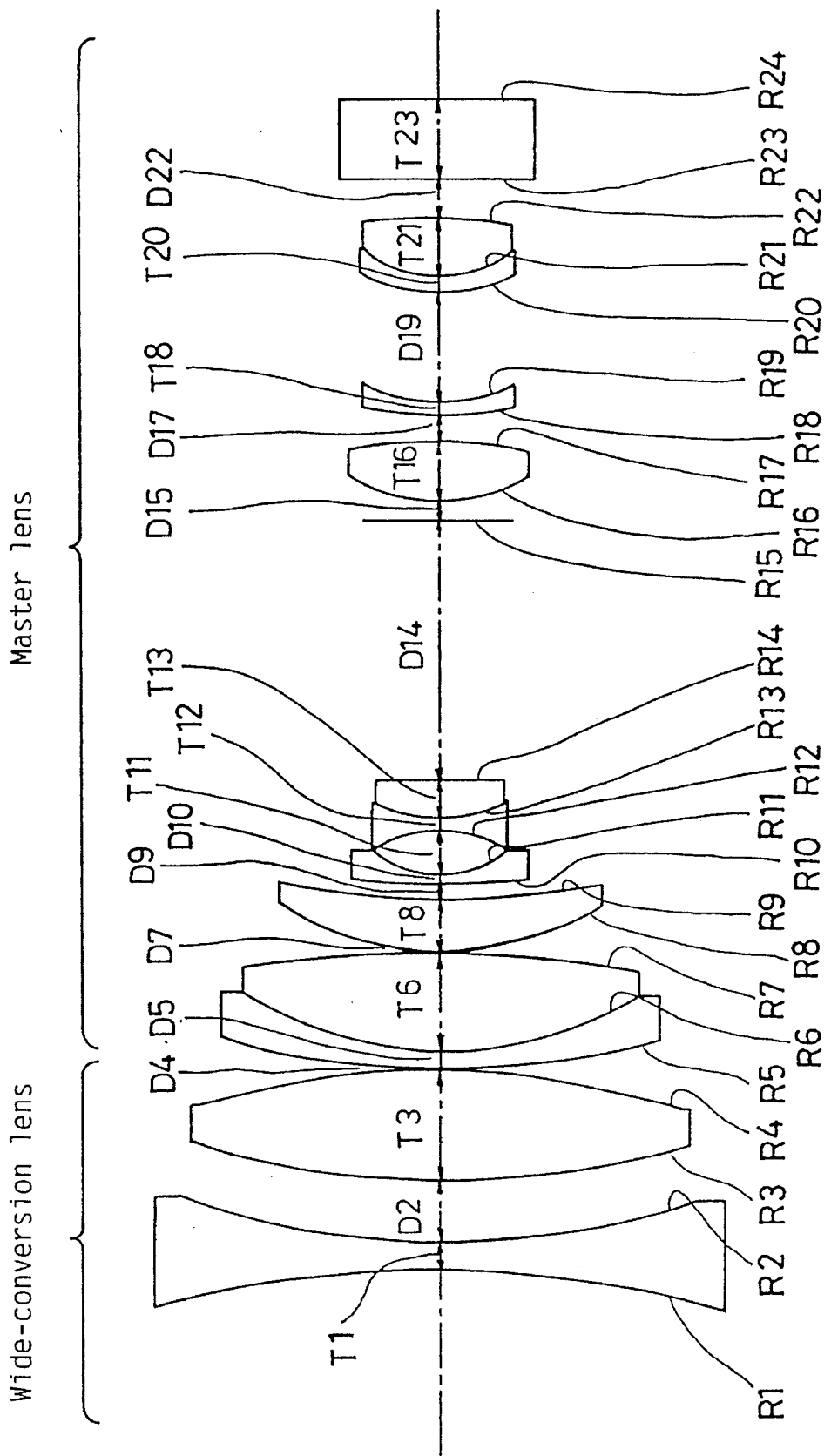
FIG. 1 is a cross-sectional view when the wide-conversion lens of the first embodiment of the present invention is attached on the front plane of a zoom lens.
Figure 7C:
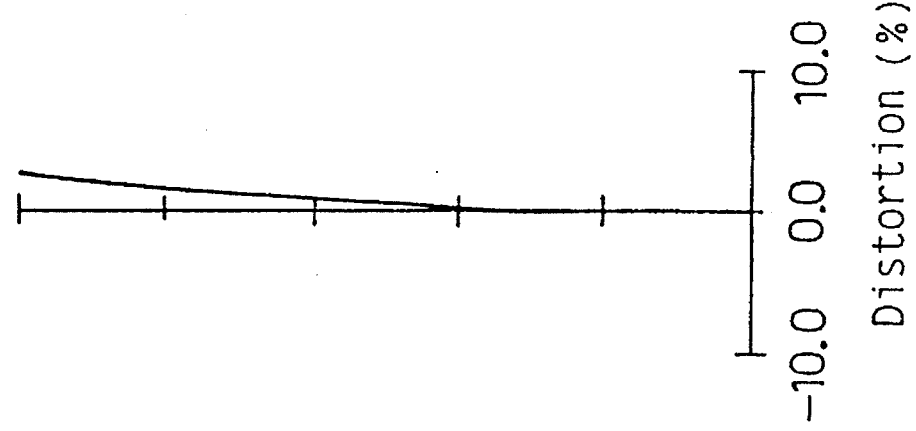
FIG. 7(a)–(c) is an aberration diagram at the telescopic extreme of the zooming action when the wide-conversion lens of the third embodiment of the present invention is attached on the front plane of a zoom lens.
Figure 7B:
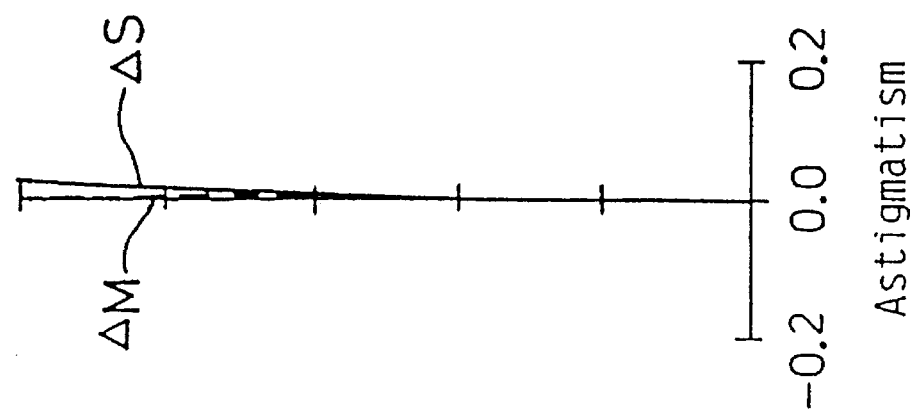
Figure 7A:
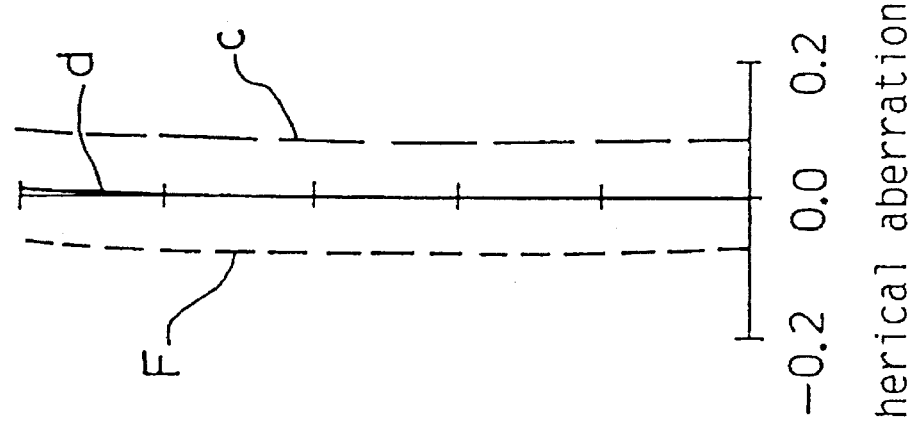
Figures 9A, 9B, 9C:
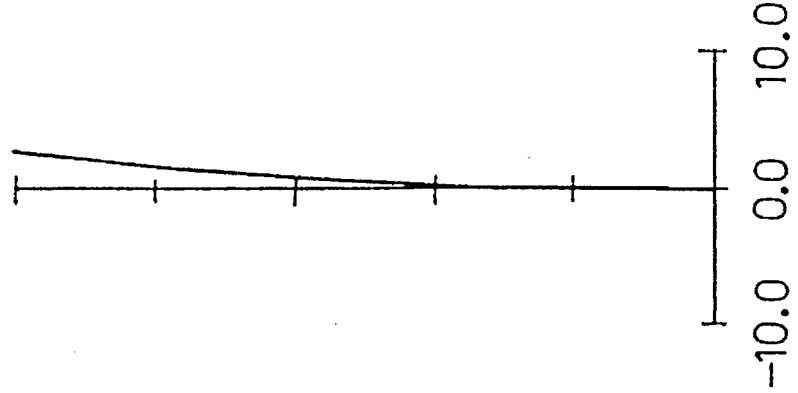
FIG. 9(a)–(c) is an aberration diagram at the telescopic extreme of the zooming action when the wide-conversion lens of the fourth embodiment of the present invention is attached on the front plane of a zoom lens.

It will be recognized that some or all of the Figures are schematic representations for purposes of illustration and do not necessarily depict the actual relative sizes or locations of the elements shown.

DESCRIPTION OF THE PREFERRED EMBODIMENT

Now, an explanation is given on the embodiments of the present invention referring to the drawings.

FIG. 1 shows a cross-sectional view of the present embodiment when the wide-conversion lens in the first embodiment of the present invention is attached on the front plane of a zoom lens that is a master lens.

Ri generally represents a radius of curvature of an i-th face of lens from the object side, Ti generally represents a thickness on axis of a lens having an i-th surface and an (i+1)-th surface, Di represents distance on axis of an inter-lens space between i-th surface of a lens and (i+1)-th surface of the next lens toward the master lens, and Ni and vi are a refractive index and an Abbe number of an i-th lens from the object side, respectively.

In general, the master lens is normally aberration-compensated within it because it is used usually by itself. Therefore, in order to obtain a satisfactory aberration characteristic as the whole when the wide-conversion lens is attached on the master lens, it is also necessary to compensate the aberration of the wide-conversion lens itself.

Thus, in the present invention, by making the first lens to be bi-negative, an excessive compensation for the spherical aberration possibly occurring at the telescopic extreme in the zooming action when the wide-conversion lens is attached on a zoom lens is prevented.

And by fulfilling the conditions (1), (2), and (3), chromatic aberration that is one of the cause of the picture quality degradation is compensated.

Furthermore, by making the radius of curvature of surfaces on the object side and on the image side of the second lens to be the same value, discrimination of the face sides of the lens in the assembling stage becomes unnecessary. Thus it provides a large advantage in the lens manufacturing.

In the following, numerical examples in the embodiment are shown.

| Numerical Example 1 Afocal magnification m = 0.87 | | | |
|---|---|---|---|
| R1 = −54.854 | T1 = 1.50 | N1 = 1.603112 | v1 = 60.7 |
| R2 = 38.089 | D2 = 3.25 | | |
| R3 = 43.000 | T3 = 5.64 | N2 = 1.516330 | v1 = 64.1 |
| R4 = −43.000 | | | |
| Numerical Example 2 Afocal magnification m = 0.82 | | | |
| R1 = −65.338 | T1 = 1.50 | N1 = 1.603112 | v1 = 60.7 |
| R2 = 35.556 | D2 = 6.23 | | |
| R3 = 46.864 | T3 = 5.10 | N2 = 1.516330 | v1 = 64.1 |
| R4 = −46.864 | | | |
| Numerical Example 3 Afocal magnification m = 0.82 | | | |
| R1 = −61.490 | T1 = 1.50 | N1 = 1.603112 | v1 = 60.7 |
| R2 = 34.808 | D2 = 5.90 | | |
| R3 = 45.196 | T3 = 5.30 | N2 = 1.516330 | v1 = 64.1 |
| R4 = −45.196 | | | |
| Numerical Example 4 Afocal magnification m = 0.85 | | | |
| R1 = −76.673 | T1 = 1.50 | N1 = 1.638539 | v1 = 55.4 |
| R2 = 39.128 | D2 = 5.90 | | |
| R3 = 49.196 | T3 = 5.30 | N2 = 1.5616329 | v1 = 64.1 |
| R4 = −49.196 | | | |
| Numerical Example 5 Afocal magnification m = 0.82 | | | |
| R1 = −69.551 | T1 = 1.50 | N1 = 1.638539 | v1 = 55.4 |
| R2 = 36.747 | D2 = 6.23 | | |
| R3 = 46.864 | T3 = 5.10 | N2 = 1.522491 | v1 = 59.8 |
| R4 = −46.864 | | | |

Numerical example of the master lens, to which the above-mentioned respective wide-conversion lenses are to be attached, is shown below.

| Numerical example of the master lens | | | |
|---|---|---|---|
| f-number = 1.85 | | Focal length: f = 4.7–46.8 | |
| R5 = 41.099 | T5 = 0.90 | N3 = 1.805177 | v3 = 25.4 |
| R6 = 18.520 | T6 = 5.10 | N4 = 1.589130 | v4 = 61.2 |
| R7 = −62.450 | D7 = 0.12 | | |
| R8 = 14.908 | T8 = 2.70 | N5 = 1.603112 | v5 = 60.7 |
| R9 = 38.640 | D9 = variable | | |
| R10 = 38.640 | T10 = 0.60 | N6 = 1.772499 | v6 = 49.6 |
| R11 = 5.694 | T11 = 2.13 | | |
| R12 = −6.668 | T12 = 0.80 | N7 = 1.665470 | v7 = 55.2 |
| R13 = 6.668 | T13 = 1.90 | N8 = 1.799250 | v8 = 24.5 |
| R14 = 82.608 | D14 = variable | | |
| R15 = (stop) | D15 = 1.00 | | |
| R16 = 7.805 | T16 = 3.00 | N9 = 1.606020 | v9 = 57.4 |
| R17 = −21.520 | D17 = 1.39 | | |
| R18 = 18.622 | T18 = 0.70 | N10 = 1.846660 | v10 = 23.9 |
| R19 = 8.379 | D19 = variable | | |
| R20 = 9.200 | T20 = 0.80 | N11 = 1.846660 | v11 = 23.9 |
| R21 = 6.120 | T21 = 2.90 | N12 = 1.606020 | v12 = 57.4 |
| R22 = −29.003 | D22 = variable | | |
| R23 = ∞ | T23 = 4.00 | N13 = 1.516330 | v13 = 64.1 |
| R24 = ∞ | | | |
| 16th aspherical plane aspherical coefficient | 17th aspherical plane aspherical coefficient | 22nd aspherical plane aspherical coefficient | |
| K = −9.14068E-1 | K = −8.60167E-1 | K = −1.19338 | |
| AD = −8.76743E-5 | AD = 1.20432F-4 | AD = 2.424495E-4 | |
| AE = −6.30037E-7 | AE = −2.01710E-6 | AE = 1.10516E-6 | |
| AF = 8.86838E-8 | AF = 8.72027E-8 | AF = 1.51740E-7 | |

-continued

Numerical example of the master lens

| AG = −3.26086E-9 | AG = −3.17966E-9 | AG = −5.90709E-9 |

TABLE 1

| Variable | Focal Length | |
|---|---|---|
| Distance | 3.92 | 38.37 |
| D9 | 0.80 | 13.36 |
| D14 | 13.54 | 0.98 |
| D19 | 5.71 | 4.60 |
| D22 | 2.01 | 3.12 |

TABLE 1 represents variable distance of inter-lens space or zoom distance at the wide-angled extreme and the telescopic extreme. And the aspheric shape is defined by the following equation:

$$Z = \frac{cy^2}{1+\sqrt{1-(1+k)c^2y^2}} + AD \cdot y^4 + AE \cdot y^6 + AF \cdot y^8 + AG \cdot y^{10},$$

where y: height from the optic axis of a point on the aspheric surface

Z: distance of a point on the aspheric surface, height of the point from the optical axis being y and being measured from a tangential plane on the aspheric surface at its apex c: radius of curvature of the aspheric surface at its apex k: conical constant AD, AE, AF, and AG: aspheric coefficients FIG. 2(a)–(c) through FIG. 11(a)–(c) are aberration diagrams when the wide-conversion lenses of numerical example 1 through numerical example 5 of the present invention are attached respectively on the front plane of the master lens in the above-mentioned embodiment. In the aberration diagrams, d, F, and c represents aberrations at the d-line, F-line, and c-line, respectively. And in the astigmatic diagrams, ΔM represents the aberration on the meridional image plane, and ΔS represents the aberration on the sagital image plane.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A wide conversion lens consisting essentially of two lens elements for decreasing a focal length of a lens system by attaching said conversion lens in front of a master lens system, the conversion lens consisting essentially of:

a biconcave first lens element located on an object side of the lens system; and a biconvex second lens element located adjacent to the master lens system, the biconvex second lens having a radius of curvature on an objective side substantially equivalent to an absolute value of a radius of curvature on an image side thereof;

wherein

| $v1 > 50$ | (1) |
| $v2 > 55$ | (2) |
| $1.5 < v2 - v1 < 10$ | (3) | where $v1$ is an Abbe number of the first lens, and $v2$ is an Abbe number of the second lens.

2. The wide-conversion lens of claim 1 wherein the master lens system comprises a zoom lens.

3. The wide conversion lens of claim 1 wherein an afocal magnification of the conversion lens is approximately 0.8.

* * * * *